March 25, 1958     J. E. BROWN     2,827,690
HOLDER FOR VEHICLE BODY PANELS

Filed Nov. 1, 1954     3 Sheets-Sheet 1

James E. Brown
INVENTOR.

BY *[signatures]*
Attorneys

March 25, 1958
J. E. BROWN
2,827,690
HOLDER FOR VEHICLE BODY PANELS
Filed Nov. 1, 1954
3 Sheets-Sheet 2
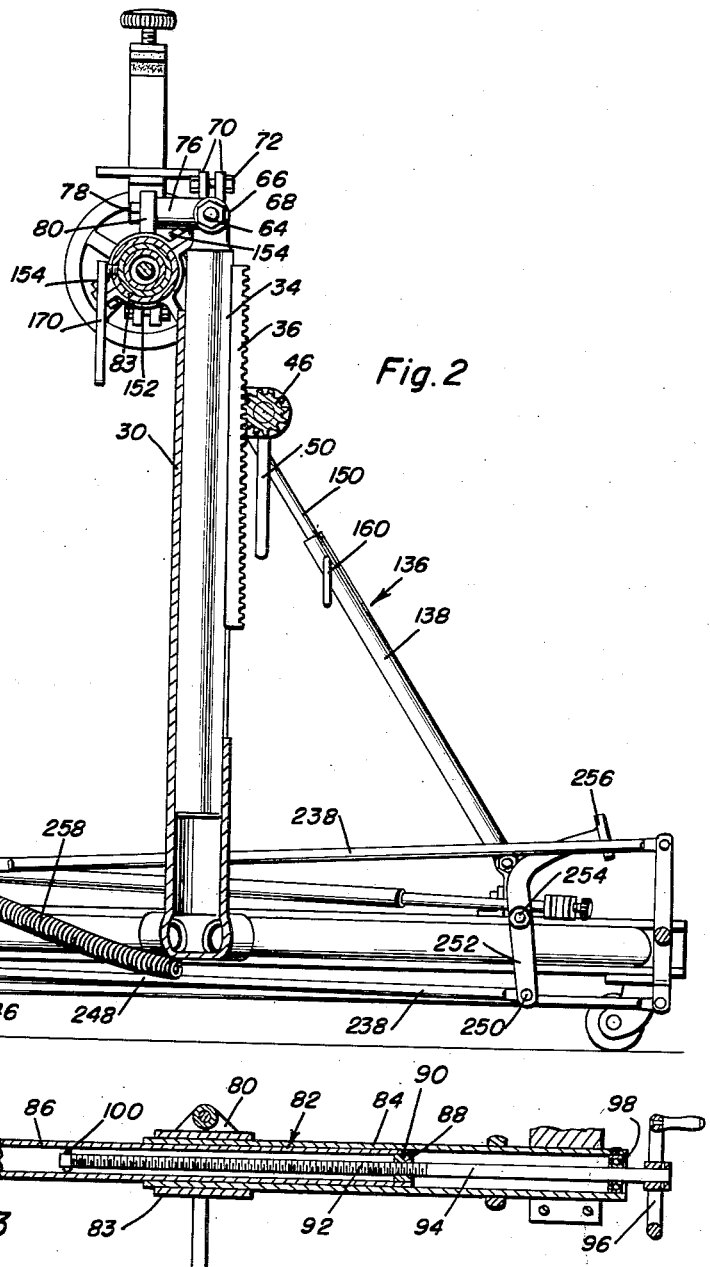
James E. Brown
INVENTOR.
BY March 25, 1958 J. E. BROWN 2,827,690
HOLDER FOR VEHICLE BODY PANELS
Filed Nov. 1, 1954 3 Sheets-Sheet 3

James E. Brown
INVENTOR.

BY
Attorneys

United States Patent Office 2,827,690
Patented Mar. 25, 1958

2,827,690

HOLDER FOR VEHICLE BODY PANELS

James E. Brown, Henderson, N. C., assignor of fifty percent to Florence N. Williams, Henderson, N. C.

Application November 1, 1954, Serial No. 466,043

2 Claims. (Cl. 29—288)

This invention relates generally to work holders, and pertains more particularly to a holder or work support for vehicle body panels.

A primary object of this invention is to provide improvements in work holders of the type utilized for positioning and holding vehicle body panels during straightening, repair, painting or similar processes, the mechanism being so constructed as to be easily portable, to readily and easily permit the work to be positioned in a desired manner for most advantageous operation thereof and to generally provide a vehicle body panel work holder which will permit a worker to repair body panels with the greatest amount of comfort and convenience.

Another object of this invention is to provide improvements in vehicle body panel work holders which incorporates an extensible standard or upright and a horizontal support arm carried thereby for supporting the body panels and in which means are provided for permitting the support arm to be rotated about a horizontal axis for positioning the body panels as desired.

Still another object of this invention is to provide an improved work holder which includes a wheeled base for ease of transporting which at the same time is provided with quick acting mechanism which will render the base relatively immobile at the will of the operator so that the assembly may be wheeled to a place of operation and then readily actuated to provide a firm and relatively immovable work stand.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical section taken substantially along the plane of section line 2—2 in Figure 1;

Figure 3 is an enlarged sectional view taken substantially upon the plane of section line 3—3 of Figure 1;

Figure 1:
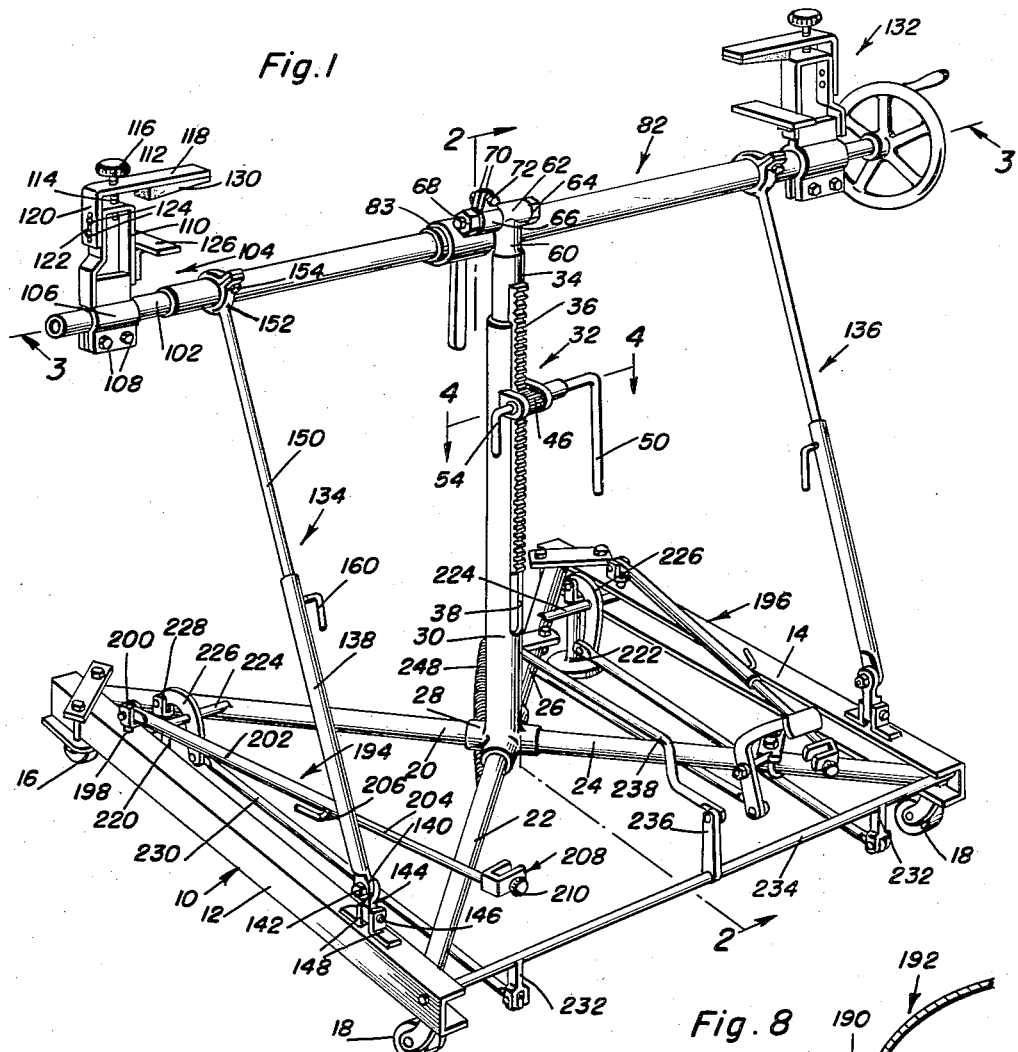
Figure 1 is a perspective view of the improved work holder.
Figure 7:
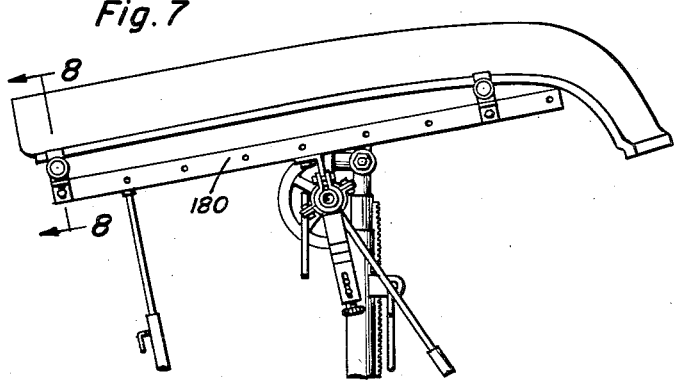
Figure 7 is an elevational view showing the upper portion of the work holder and attachment means associated therewith for holding an automotive hood, also illustrated.

Referring now more particularly to the drawings, it will be noted that the work holder or stand consists essentially of a base, indicated generally by the reference character 10 which includes opposed spaced side frame members 12 and 14. These side frame members are shown in the drawings as formed of channel-shaped configuration, but it will, of course, be appreciated that any suitable configuration may be followed. Each of the side frame members is provided with a pair of wheels 16 and 18 which are preferably of the caster type, such as to render the base very mobile and easily positioned in a desired manner, it being noted that the wheels are so provided on the base assembly that one is disposed in each corner thereof. Interconnecting the side frame members 12 and 14 is an X-shaped assembly embodying the four arm members 20, 22, 24 and 26 which are rigidly secured at their outer ends to corresponding side frame members 12 and 14 and which are received within and secured to bosses 28 which extend radially from the lower end of a vertical tubular member 30.

The tubular member 30 forms a portion of an upright assembly which is indicated generally by the reference character 32 and which will be seen to consist also of a vertical extension rod member 34 having a gear rack 36 formed along one side thereof and extending a substantial longitudinal distance thereon in the manner shown. The lower portion or tubular member 30 of the upright assembly 32 is provided with a longitudinally extending slot 38 extending downwardly from its upper end and within which the rack 36 is received.

It will be seen that the gear rack 36 projects completely through the slot 38 and forms in conjunction therewith a guide between the upper and lower sections 34 and 30, respectively, of the upright assembly 32 to prevent rotation of the upper section 34 with respect to the lower, and generally guide the movement of the same as the upper section is extended from within the lower section.

Figure 4:
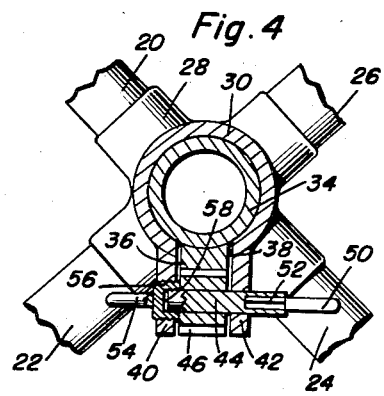
Figure 4 is an enlarged horizontal section taken substantially along the plane of section line 4—4 in Figure 1.

For the purpose of extending the upper section 34 of the standard or upright 32, a pair of bracket ear members 40 and 42 are provided adjacent the upper end of the lower portion 30 on opposite sides of the slot 38 and journaled therebetween is a shaft member 44 upon which a gear 46 is rigidly engaged. The gear 46 meshes with the rack 36 and by manipulating the hand crank member 50 which has a non-circular end portion 52 received in a correspondingly formed recess in one end of the shaft 44, it will be readily apparent that vertical extension or retraction of the upper section 34 will be effected. When the desired vertical height of the upper section 34 has been attained, the hand crank member 54 may be manipulated to hold the adjustment in that position. This, as will be seen most clearly in Figure 4, is accomplished by virtue of the fact that the hand crank has a hub portion 56 threadedly engaged within the bracket ear 40 such that rotation of the crank 54 will effect an inward movement of the hub 56 into engagement with the gear 46 and prevent rotation of the same. The hub 56 is provided with a pocket or recessed portion 58 within which the corresponding end of the shaft 44 is journaled.

Rigidly secured to the upper end of the section 34 of the standard or upright 32 is a neck member 60 which terminates in a boss 62 provided with a horizontal transverse bore through which a pivot bolt member 64 is projected. It is preferred that the pivot bolt 64 be affixed relative to the neck 60 so as to be non-rotatable with respect thereto, and it is also preferred that a portion thereof be of smooth character such as to rotatably receive a split collar member 66 for selective rotation thereof. The free end of the pivot bolt 64 receives a nut 68 for retaining the collar 66 thereon.

The collar itself is provided with spaced radial ear members 70 at its adjacent split ends which receive therethrough a bolt member 72 whereby the split collar 66 may be rigidly clamped to the pivot bolt 64. The collar 66 is provided with a further radial ear 76 rigidly secured thereto and extending substantially at right angles to the ears 70, although it is to be understood that this angular relationship is not critical nor does it in any way affect the operation of the invention, and in actual construction, this latter ear 76 may be provided with a laterally bent end portion tapped to receive a bolt member 78 by means of which an ear 80 is rigidly secured thereto. The ear 80 is rigid with a sleeve 83 which, in turn, rotatably receives the support arm assembly 82.

The support arm assembly, as indicated most clearly in Figure 3, will be seen to consist of an outer casing or body member 84 of tubular construction to which the previously mentioned ear 80 and sleeve 83 may be rigidly affixed and within which an inner casing section 86 is telescopically received for longitudinal extension and retraction therewith. For this purpose, it will be apparent that the section 86 which like the outer section is of tubular configuration, is provided at its inner end with a nut member 88 rigidly secured thereto and by a pin 90 or setscrew or any suitable means which threadedly receives the inner end or threaded portion 92 of an actuating rod 94 which projects therefrom outwardly from the opposite end of the outer casing or section 84 and has provided thereon a hand wheel operating member 96 in the manner shown. Of course, the shaft 94 needs be suitably journaled with respect to the outer casing, and for this purpose, a bearing member 98 may be provided therein, in the manner shown clearly in Figure 3.

The extremity of the inner end of the rod 94 may be provided with a cotter pin or the like 100 to form a stop and prevent complete disengagement between the threaded portion 92 thereof and the nut 88 affixed to the casing 86.

The support arm section 86 is provided with an extension 102 engaged therewith in any suitable manner, such as the threads shown, and mounted on this extension is the clamp assembly indicated generally by the reference character 104. The clamp assembly consists of a split collar member 106 clampingly engaged upon the extension by virture of the bolts 108 and also includes an inverted generally U-shaped member 110 whose bight portion 112 is provided with a tapped aperture to receive an adjusting screw member 114. The adjusting screw terminates at its upper end in a hand knob 116 which bears against the upper surface of the horizontal portion 118 of a movable jaw member generally of L-shaped configuration whose depending portion 120 is provided with an elongated slot 122 guidably receiving the bolts or rivet members 124 secured to the member 110. A pedestal member 126 is secured to the member 110 in the manner shown most clearly in Figure 1, and is disposed directly below the free end portion of the member 118 whose undersurface is provided with a pad of soft resilient material 130. A second clamp assembly 132 is disposed opposite the clamp 104 at the outer end of the support arm casing section 84 and is similar in all respects to the latter clamp, and for this reason no specific description thereof is necessary.

As previously stated, the rack 36 engaging within the slot 38 of the upright portion 30 prevents rotational movement between the members 30 and 34 and to supplement this action, the stabilizing arm assemblies, indicated generally by the reference characters 134 and 136 are provided. The stabilizer arms are of identical construction, and each includes a lower tubular portion 138 having a flattened end 140 receiving a pivot bolt 142 by means of which the lower end of the tubular portion is pivotally secured to a link member 144 which is, in turn, pivoted, as by a pin 146, between a pair of bracket ears 148 rigidly affixed to a corresponding side frame member 12 or 14. It is to be noted that the axes of the two pins 142 and 146 are disposed in perpendicular relationship such that a universal motion is permitted thereof. Each of the stabilizing arms additionally includes an upper section 150 of rod-like configuration which is telescopically received within the lower tubular section 134 and terminates at its upper end in a yoke 152 of split construction for selective clamping engagement with the support arm by means of the bolts 154.

Each of the tubular portions 138 of the stabilizer arms is provided with a setscrew member 160 such as to hold the desired adjusted length of each of the stabilizer arms in a manner which will be readily apparent.

Figure 5:
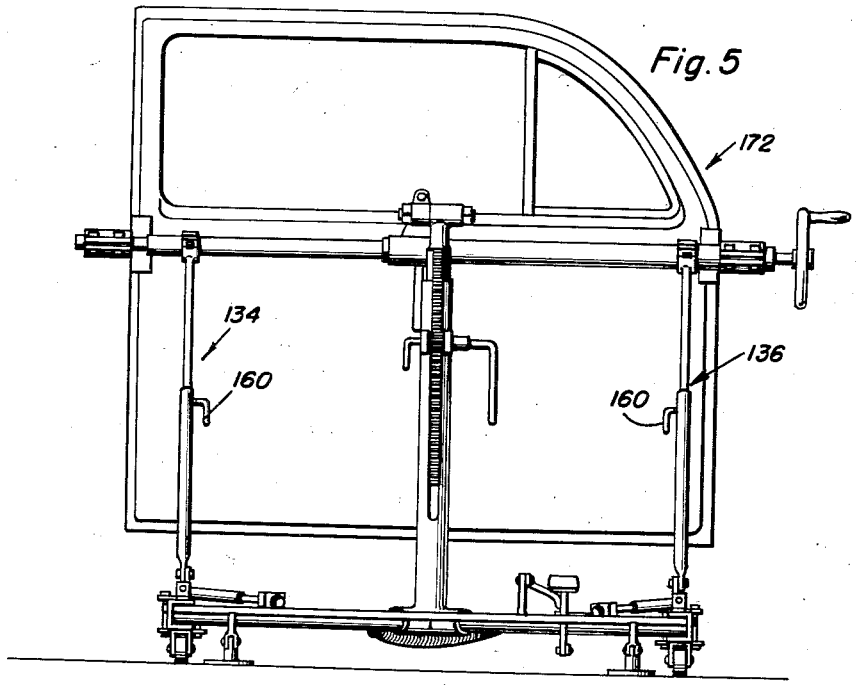
Figure 5 is an elevational view showing the holder supporting a door assembly.
Figure 6:
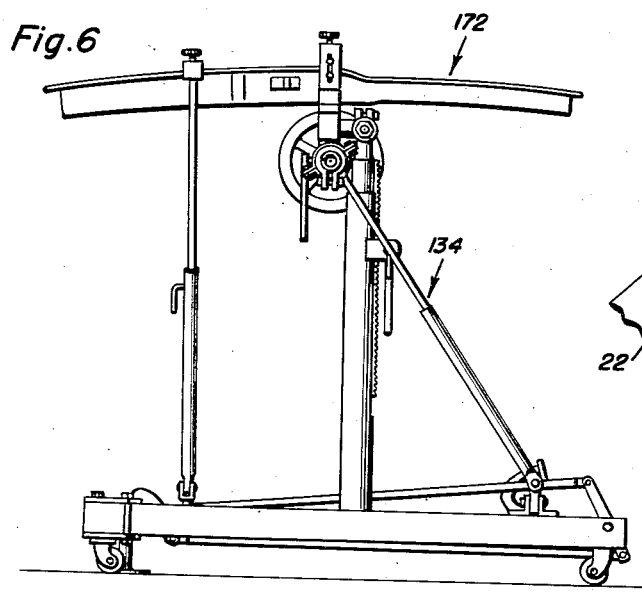
Figure 6 is a view similar to Figure 5, but showing the vehicle door positioned in a horizontal manner.

It will be apparent from the structure thus far described, that the support arm assembly is permitted of both vertical adjustment by virtue of the extensibility of the standard assembly 32 and of rotational movement by virtue of the journaling of the support arm within the sleeve member 83. For the purpose of holding the rotational adjustment of the support arm, a setscrew member 170 provided with a hand crank is threadedly engaged through the sleeve 83 and is selectively engageable with the support arms to hold the desired adjustment. Thus, a body panel, such as the door illustrated in Figures 5 and 6 by the reference character 172 generally, may be held either in a vertical position as shown in Figure 5 or a horizontal position, such as shown in Figure 6, or in any intermediate desired position, at the will of the operator. Of course, during vertical and pivotal adjustments of the body panel, the stabilizer arms 134 and 136 must be adjusted accordingly, this being done automatically by merely slacking off on the setscrew members 160. Of course, too, the bolts 154 on the stabilizing arms 134 and 136 must be loosened at any time the support arm assembly 82 is to be rotatably adjusted.

Figure 8:
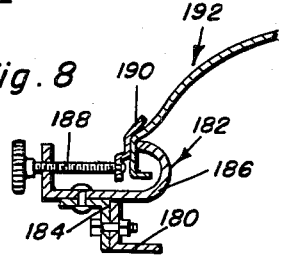
Figure 8 is an enlarged vertical section taken substantially along the plane of section line 8—8 in Figure 7.

For the purpose of utilizing the holder in conjunction with hoods, the clamp assemblies may be removed, and the transverse angle irons or bars 180 substituted in lieu thereof. These bars are attached at their midpoints approximately to the opposite ends of the support arm assembly 82 and are provided, as will be seen most clearly in Figure 8, with slightly modified clamp assemblies 182. The clamps 182 are secured by any suitable means, such as the angle brace members 184 to the bars 180 and will be seen to include J-shaped sections 186 and cooperative clamping screws 188 provided with jaw members 190 at their free ends for engaging the hood assembly indicated generally by the reference character 192. In this respect, it will be noted that the jaw members 190 are so configurated as to naturally conform to the outer contour of the edge portions of the hood assembly 192.

When the assembly is to be utilized with either the door panels 172 or the like or the hood panels 192, it may be necessary and it is frequently desirable to rigidify these panels with mechanism other than that already illustrated and described. For this purpose, brace or additional support arm assemblies 194 and 196 are provided. These additional support arms are affixed to the side frame members 12 and 14 by means of yoke members 198 which are pivotally secured to the side frame members about a vertical axis and which have bifurcated end portions 200 pivotally receiving therebetween the lower flat ends of tubular members 202 forming the lower portion of the auxiliary support arms.

The auxiliary support arms also include upper rod sections 204 telescopically received in the lower tubular portions 202 and selectively rigidly connected thereto by means of the setscrew members 206 carried by the tubular portions 202 and at the upper ends of these rods are provided the clamp assemblies 208. The clamp assemblies 208 are of U-shaped configuration and are rigidly disposed in the manner shown with a clamp screw 210 threadedly engaged through one of the legs of the U-shaped portion for operative engagement with an associated panel in a manner which it is believed will be readily apparent. The use of these auxiliary support arms or brace members is shown clearly in Figure 6 of the drawings.

It will be appreciated that in addition to their rigidifying effect on the body panels, the auxiliary support arms 194 and 196 may serve as aligning devices as well. In this respect, their lengths may be adjusted to predetermined amounts and the associated body panel reshaped to conform with the positioning indicated thereby.

As previously described, there are four caster wheels supporting the entire assemblage for rendering the same easily portable and mobile. However, it will be desirable once the assembly has been positioned for performing a work operation, to render the same relatively immobile, and for this purpose, elevating foot members 220 and 222 are provided. Shaft members 224 are rigidly connected between the side frame members 12 and 14 and associated cross-arms 20 and 26, respectively, in the manner shown most clearly in Figure 1, and a bell-crank member 226 is associated with each one of these shafts by a pivotal connection therewith, with the opposite ends of the bell-crank being connected to the upper bifurcated ends 228 of the foot members 220 and 222 and to a link member 230, respectively. The link members 230 are connected at their forward ends to yoke members 232 rigid with a rocker arm shaft 234 which is pivotally received and extends between the side frame members 12 and 14. An arm 236 is rigid with the rocker arm shaft 234 intermediate its ends, and an actuating link 238 is pivotally secured thereto. The opposite end of the actuating link 238 is pivotally connected, as at 240, to the upper end of an idler crank member 242. The idler link is pivotally secured, as at 244, intermediate its ends to the base of the assembly and its lower end is pivotally connected, as at 246, to one end of a connecting link member 248 which extends therefrom for pivotal connection at 250 to the lower end of the pedal shank 252. The pedal shank is, in turn, connected at its midportion pivotally to the frame, as at 254, and its upper end carries a pedal pad member 256.

A tension spring member 258 is secured at its opposite ends between the upper end of the idler crank 242 and a suitable point on the base or frame of the assembly such that when the pedal pad 256 is depressed to lower the foot members 220 and 222 and thus elevate the associated wheels 16 above the surface of the floor, the spring will serve to retain the idler link 242 in overcenter relationship with respect to its pivot 244 and retain the assembly in the wheel elevated position described. This will render the base relatively immovable and will serve to provide a relatively secure and immobile base support for the holder assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A work holder for automotive panel units comprising a wheel base, means operative for elevating a portion of said base for rendering the same immobile, a vertical standard secured to said base, said standard including a lower portion rigidly secured to said base and an upper portion telescopically engaged within the lower portion, means for maintaining the upper and lower standard portions in selected extended position, a horizontal support arm selectively journaled on a free end of said upper portion for rotation about a horizontal axis and extending from opposite sides of said standard, said support arm including first and second extensible sections, a pair of body panel gripping clamps secured to opposite free end portions of the extensible sections of said support arm at opposite sides of said standard, said clamps including an adjustable jaw portion each opening toward the other, said jaw portions being engageable on opposite edge portions of a panel retained therebetween, and means for selectively extending and retracting the extensible sections of said support arms to move said clamps toward and away from each other for accommodating various widths of panels to be secured therebetween, and pedal operative means on said base for operating the first named means.

2. A holder for automotive body panel components comprising a base, a vertical standard secured to and upstanding from said base, a selectively adjustable vertical extension mounted on said standard, a horizontal support arm selectively journaled on an upper end portion of said extension for rotation on a horizontal axis and extending from opposite sides of said standard, panel gripping clamps mounted on opposite end portions of said support arm at opposite sides of said standard for retaining a body panel therebetween, each of said clamps including an adjustable jaw portion opening toward the other, said jaw portion being engageable on opposite edge portions of the panel therebetween, said support arm being formed of extensible sections for moving said clamps toward and away from each other for accommodating various widths of panels to be secured therebetween, and a pair of auxiliary support arms pivoted to said base about axes parallel with the horizontal support arm, said auxiliary support arms being extensible and having adjustable clamp jaws at free end portions thereof which open toward each other for connection over oppositely disposed edge portions of an associated body panel.

References Cited in the file of this patent

UNITED STATES PATENTS

| | | |
|---|---|---|
| 632,381 | Theadore | Sept. 5, 1899 |
| 1,295,463 | Flair | Feb. 25, 1919 |
| 1,826,493 | Bahrman | Oct. 6, 1931 |
| 2,446,487 | O'Kelley | Aug. 3, 1948 |
| 2,465,206 | Davis | Mar. 22, 1949 |
| 2,637,449 | Hammer | May 5, 1953 |
| 2,675,609 | Miller | Apr. 20, 1954 |
| 2,680,287 | Wilson | June 8, 1954 |

FOREIGN PATENTS

| | | |
|---|---|---|
| 537,989 | Germany | Oct. 22, 1931 |